United States Patent
Gantenbein et al.

(10) Patent No.: US 9,233,385 B2
(45) Date of Patent: Jan. 12, 2016

(54) TEMPERATURE INDICATING FOAM GUN NOZZLES AND HOSES

(71) Applicant: FOMO PRODUCTS, INC., Norton, OH (US)

(72) Inventors: Stefan Gantenbein, Medina, OH (US); Thomas Fishback, Cuyahoga Falls, OH (US); Douglas Caffoe, Aurora, OH (US); Sara Jonas, Streetsboro, OH (US); John McQuaid, Akron, OH (US)

(73) Assignee: Fomo Products, Inc., Norton, OH (US)

( * ) Notice: Subject to any disclaimer, the term of this patent is extended or adjusted under 35 U.S.C. 154(b) by 197 days.

(21) Appl. No.: 13/893,911

(22) Filed: May 14, 2013

(65) Prior Publication Data

US 2014/0339327 A1    Nov. 20, 2014

(51) Int. Cl.
*G01K 11/16* (2006.01)
*B05B 15/00* (2006.01)
*B05B 7/00* (2006.01)

(52) U.S. Cl.
CPC .............. *B05B 15/00* (2013.01); *B05B 7/0018* (2013.01); *G01K 11/16* (2013.01); *G01K 11/165* (2013.01)

(58) Field of Classification Search
CPC ..... B65D 83/28; G01K 11/165; G01K 11/16; G01K 13/02; G01K 13/022; G01K 2013/026
USPC ............ 239/71, 302–308, 74, 75, 407–416.3, 239/583, 584; 374/162, 147; 422/86, 82.08, 422/82, 12
See application file for complete search history.

(56) References Cited

U.S. PATENT DOCUMENTS

| | | | | |
|---|---|---|---|---|
| 4,311,802 A * | 1/1982 | Golser | .................. | B29B 7/7466 422/133 |
| 4,826,550 A * | 5/1989 | Shimizu | .................. | C08K 9/10 106/31.16 |
| 4,919,983 A * | 4/1990 | Fremin | ..................... | A61J 9/02 215/11.2 |
| 6,161,725 A * | 12/2000 | Dean | ....................... | B29B 7/726 222/146.3 |
| 6,281,165 B1 * | 8/2001 | Cranford | ............ | A47G 19/2227 427/150 |
| 6,296,146 B2 * | 10/2001 | Dean | ............................ | 222/135 |
| 6,345,776 B1 * | 2/2002 | Hurray | .................. | B29B 7/7438 222/137 |
| 6,719,210 B2 * | 4/2004 | Clarke | ..................... | G01F 23/22 116/207 |
| 7,266,949 B2 * | 9/2007 | Jeuch | ..................... | F25B 17/08 62/101 |
| 7,332,109 B2 | 2/2008 | Senga et al. | | |
| 7,670,566 B2 * | 3/2010 | Adair | .................. | A01M 1/2077 239/34 |
| 7,798,706 B2 * | 9/2010 | LaGuardia | ............... | G01K 1/14 116/216 |
| 7,819,578 B2 * | 10/2010 | Coney | ...................... | G01K 1/14 374/141 |
| 8,067,350 B2 * | 11/2011 | Wenzel | ..................... | A61K 8/02 510/130 |
| 8,118,052 B2 * | 2/2012 | Swab | .................... | B29C 44/367 137/208 |
| 8,123,081 B2 * | 2/2012 | Swab | .................... | B05B 7/0408 222/145.2 |
| 8,435,924 B2 | 5/2013 | Arora et al. | | |
| 8,486,080 B2 * | 7/2013 | McKay | .............. | A61B 17/8805 606/94 |
| 8,911,861 B2 * | 12/2014 | Parker | .................. | G01K 11/165 252/586 |

(Continued)

*Primary Examiner* — Arthur O Hall
*Assistant Examiner* — Joseph A Greenlund
(74) *Attorney, Agent, or Firm* — Hahn Loeser & Parks LLP

(57) ABSTRACT

The invention described herein generally pertains to temperature-indicating foam gun nozzles and/or at least one temperature-indicating hose which employs at least one thermochromic material disposed within said foam gun nozzle and/or hoses.

34 Claims, 8 Drawing Sheets

(56) References Cited

U.S. PATENT DOCUMENTS

| | | | | |
|---|---|---|---|---|
| 2004/0164174 A1* | 8/2004 | Day | A47G 21/182 | 239/33 |
| 2006/0287215 A1* | 12/2006 | McDonald | A61K 8/02 | 510/441 |
| 2008/0141682 A1* | 6/2008 | Jeuch | F25D 31/006 | 62/3.64 |
| 2008/0315163 A1* | 12/2008 | Schroer | G01K 11/12 | 252/586 |
| 2009/0000546 A1* | 1/2009 | Rueschhoff | B05D 1/00 | 118/679 |
| 2009/0306674 A1* | 12/2009 | Chandler | A61N 17/8802 | 606/93 |
| 2011/0067576 A1* | 3/2011 | White | A47J 27/2105 | 99/323.1 |
| 2011/0121094 A1* | 5/2011 | Burney | A47G 21/182 | 239/24 |
| 2014/0339327 A1* | 11/2014 | Gantenbein | B05B 7/0018 | 239/71 |

* cited by examiner

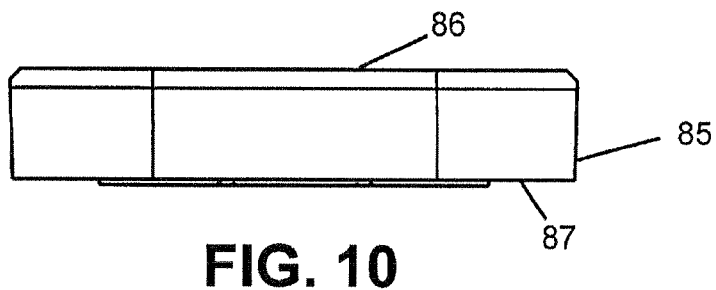
FIG. 10
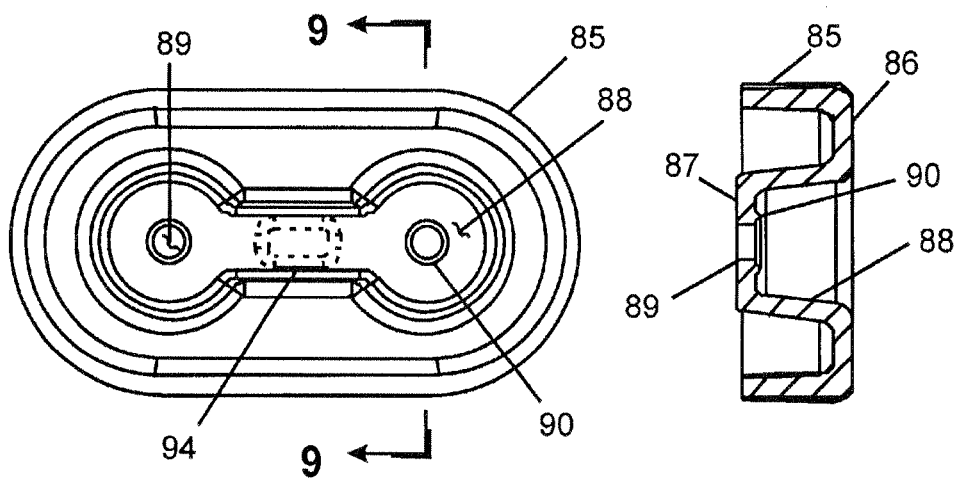
FIG. 8
FIG. 9
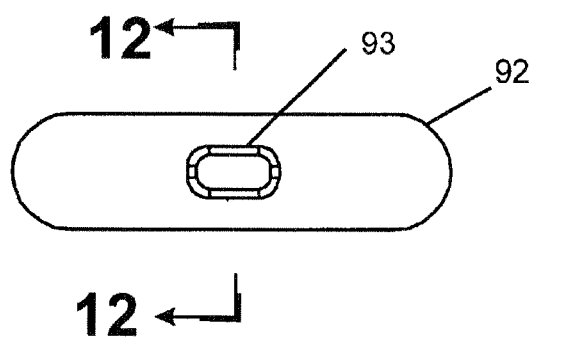
FIG. 11
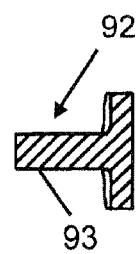
FIG. 12

TEMPERATURE INDICATING FOAM GUN NOZZLES AND HOSES

TECHNICAL FIELD

The invention described herein pertains generally to temperature-indicating foam gun nozzles and hoses.

BACKGROUND OF THE INVENTION

This invention is particularly suited for in-situ applications of liquid chemicals mixed and dispensed as a spray or a foam and more specifically, to in-situ application of polyurethane foam or froth and the measurement of the temperature of the chemicals used therewith. In-situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in-situ applications is typically supplied as a "one-component" froth foam or a "two-component" froth foam in portable containers hand carried and dispensed by the operator through either a valve or a gun. However, the chemical reactions producing the polyurethane froth foam in a "one-component" polyurethane foam is significantly different than the chemical reactions producing a polyurethane froth foam in a "two-component" polyurethane foam. Because the reactions are different, the dispensing of the chemicals for a two-component polyurethane foam involves different and additional concepts and concerns than that present in the dispensing apparatus for a "one-component" polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. While one-component guns can variably meter the polyurethane froth, they are typically used in caulk/glue applications where an adhesive or caulk bead is determined by the nozzle configuration. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip; and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.).

In a two-component polyurethane foam, the "A" and "B" components form the foam or froth, when they are mixed in the gun. Of course, chemical reactions with moisture in the air will also occur with a two-component polyurethane foam after dispensing, but the principal reaction forming the polyurethane foam occurs when the "A" and "B" components are mixed, or contact one another in the dispensing gun. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam (foam assumes consistency resembling shaving cream) is enhanced by the fluorocarbon (or similar) component, which is present in the "A" and "B" components. This fluorocarbon component is a compressed gas which exits in its liquid state under pressure and changes to it gaseous state when the liquid is dispensed into a lower pressure ambient environment, such as when the liquid components exit the gun and enter the nozzle.

While polyurethane foam is well known, the formulation varies considerably depending on application. In particular, while the polyols and isocyanates are typically kept separate in the "B" and "A" containers, other chemicals in the formulation may be placed in either container with the result that the weight or viscosity of the liquids in each container varies as well as the ratios at which the "A" and "B" components are to be mixed. In the dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A" and "B" chemical formulations, the "A" and "B" containers are charged (typically with an inert gas,) at different pressures to achieve equal flow rates. The metering valves in a two-component gun, therefore, have to meter different liquids at different pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle. In practice, often the gun operator adjusts the ratio settings to improve gun "performance" with poor results. To counteract this adverse result, the ratio adjustment then has to be "hidden" within the gun, or the design has to be such that the ratio setting is "fixed" in the gun for specific formulations. The gun cost is increased in either event and "fixing" the ratio setting to a specific formulation prevents interchangeability of the dispensing gun.

Besides the ratio control which distinguishes two-component dispensing guns from one-component dispensing guns, a concern which affects all two-component gun designs (not present in one-component dispensing guns) is known in the trade as "cross-over". Generally, "cross-over" means that one of the components of the foam ("A" or "B") has crossed over into the dispensing mechanism in the dispensing gun for the other component ("B" or "A"). Cross-over may occur when the pressure variation between the "A" and "B" cylinders becomes significant. Variation can become significant when the foam formulation initially calls for the "A" and "B" containers to be at high differential charge pressures and the containers have discharged a majority of their components. (The containers are accumulators which inherently vary the pressure as the contents of the container are used.) To over-come this problem, it is known to equip the guns with conventional one-way valves, such as a poppet valve (or other similarly acting device). While necessary, the dispensing gun's cost is increased.

Somewhat related to cross-over and affecting the operation of a two-component gun is the design of the nozzle. The nozzle is a throw away item detachably mounted to the gun nose. Nozzle design is important for cross-over and metering considerations in that the nozzle directs the "A" and "B" components to a static mixer in the gun.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. This is why the nozzles, which contain the static mixer, are designed are throw away items. In practice, the foam does not instantaneously form within the nozzle upon cessation of metering to the point where the nozzles have to be discarded. Some time must elapse. This is a function of the formulation itself, the design of the static mixer and, all things being equal, the design of the nozzle.

The dispensing gun of the present invention is particularly suited for use in two-component polyurethane foam "kits" typically sold to the building or construction trade. Typically, the kit contains two pressurized "A" and "B" cylinders of about 7.5 inches in diameter which are pressurized anywhere between 150-250 psi, a pair of hoses for connection to the cylinders and a dispensing gun, all of which are packaged in a container constructed to house and carry the components to the site where the foam is to be applied. When the chemicals in the "A" and "B" containers are depleted, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

The dispensing guns cited and to which this invention relates are additionally characterized and distinguished from other types of multi-component dispensing guns in that they are, "airless" and do not contain provisions for cleaning the gun. That is, a number of dispensing or metering guns or apparatus, particularly those used in high volume foam applications, are equipped or provided with a means or mechanism to introduce air or a solvent for cleaning or clearing the passages in the gun. The use of the term "airless" as used in this patent and the claims hereof means that the dispensing apparatus is not provided with an external, cleaning or purging mechanism.

While the two-component dispensing guns discussed above function in a commercially acceptable manner, it is becoming increasingly clear as the number of in-situ applications for polyurethane foam increase, that the range or the ability of the dispensing gun to function for all such applications has to be improved. As a general example, the dispensing gun design has to be able to throttle or meter a fine bead of polyurethane froth in a sealant application where the kit is sold to seal spaces around window frames, door frames, and the like in the building trade. In contrast, where the kit is sold to form insulation, an ability to meter or flow a high volume flow of chemicals is required. Still yet, in an adhesive application, liquid spray patterns of various widths and thickness are required. While the "A" and "B" components for each of these applications are specially formulated and differ from one another, one dispensing gun for all such applications involving different formulations of the chemicals is needed.

At least one recurring quality issue facing the disposable polyurethane foam kit industry is the inability of end-users to effectively assess the core chemical temperature of the liquid and gas contents contained therein. Two important functions are often negatively impacted: achievement of maximum foam kit yield on the job site, and proper chemical cure of the "A" & "B" components.

Maximum yield is highly desired by purchasers of polyurethane foam kit products. If the chemicals are too cold for optimum use, the "B"-side viscosity increases, which in turn distorts the 1:1 ratio (by weight) required for proper yield. Lower-than-advertised yields carry significant economical consequences for the contractor.

Proper chemical cure (on-ratio ~1:1) is also critical to achieving maximum physical properties. It ensures that the cured foam meets building code specifications, e.g. fire ratings. In addition, a complete, on-ratio cure is critical for the health and safety of foam kit operators and building occupants. Again, cold chemical temperatures (below recommended) can create off-ratio foam, with the resulting incomplete chemical cure.

At least one important variable impacting the above issues is the core chemical temperature of the liquid/gas contents of the foam kit. The core chemical temperature of a kit before use must meet the manufacturer's recommended temperature, usually ~75° F.-85° F., in order to meet the objectives of maximum yield and proper (complete) chemical cure. However, end-users typically do not condition the kits long enough at the recommended temperature. For example, kits stored in an unconditioned warehouse or insulation truck in the winter months may have a core chemical temperature of only ~40° F. If dispensed without being conditioned for a sufficient amount of time, the result is foam of very poor physical quality and appearance. Also, improper chemical cure will most likely occur (unbalanced ratio of "A" to "B" chemical, which is typically 1:1 by weight). This "off-ratio" foam becomes a liability for the reasons mentioned above. It can take up to 48 hours to condition cylinders to the recommended chemical temperature, a recommendation often ignored by end-users.

The industry has long searched for an effective, economical way to allow end-users to gauge the core chemical temperature of a kit with a reasonable degree of qualitative accuracy before applying the foam. This invention utilizes thermochromism in both the nozzle and the hoses associated with the "A" and "B" chemicals to determine when the temperature of the chemicals falls within the acceptable use range, based upon the color change of the nozzle or hose due to a change in temperature of the flowing chemical.

SUMMARY OF THE INVENTION

In accordance with the present invention, there is provided a frothable foam, the application temperature of which can be easily measured.

It is yet another aspect of the invention to provide a two-component spray gun having a housing having a pair of inlet openings positioned in a canted orientation on top of said housing for insertion of an "A" and a "B" flexible plastic hose from respective "A" and "B" cylinders containing chemicals therein, the housing having a metering valve disposed within the housing, the housing having a removable plastic spray nozzle affixed to a front of the housing, the plastic spray nozzle comprising at least one thermochromic material disposed within or affixed thereupon the plastic nozzle.

It is still another aspect of the invention to provide a process to determine if chemicals used to make a two-component foam are at or above an acceptable use temperature range, the process comprising using a spray gun having a nozzle comprising at least one thermochromic material contained therein or affixed thereupon.

The above and other aspects of the invention are achieved by the incorporation of at least one thermochromic material which is either a liquid crystal or a leuco dye.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawing which form a part hereof, and wherein:

FIG. 8 is a front view of the back plate used in the nozzle;

FIG. 9 is a section view of the back plate taken generally along the lines designated 9-9 of FIG. 8;

FIG. 10 is a top view of the back plate;

FIG. 11 is a front view of the one-way valve;

FIG. 12 is a cross-section view of the one-way valve of FIG. 11 taken along line 12-12 of FIG. 11;

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
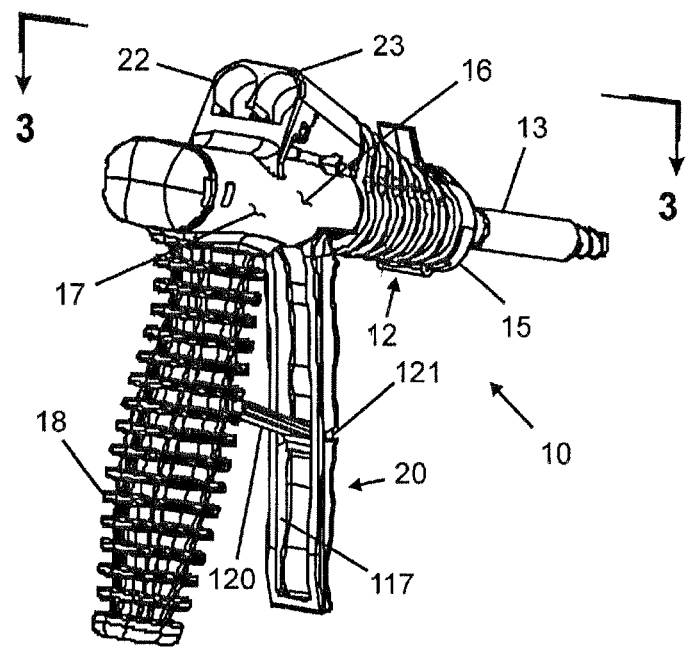
FIGS. 1 & 2 are perspective views of the dispensing gun.
Figure 2:
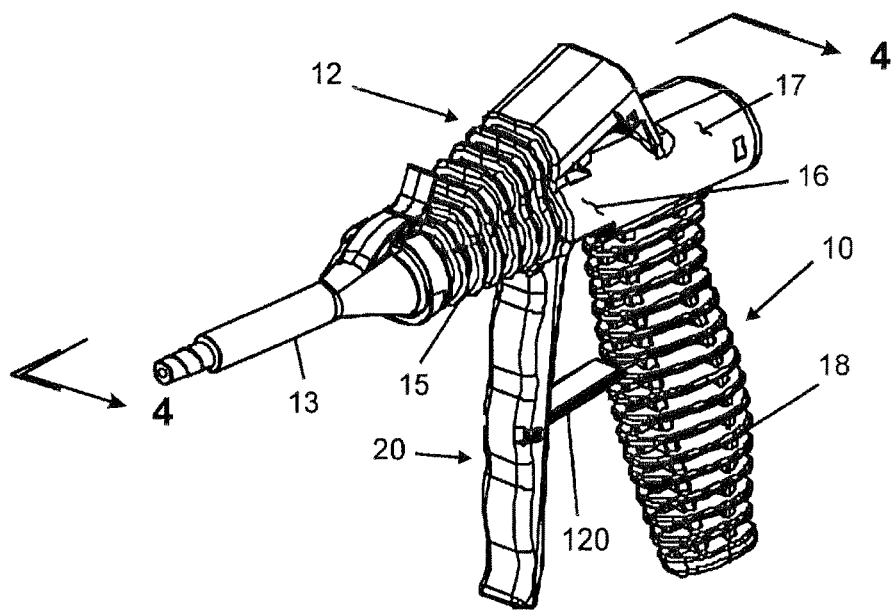

The invention relates to, as shown in perspective views in FIGS. 1 & 2, an airless (as that term is previously defined) two-component dispensing gun 10. Dispensing gun 10 may be viewed as comprising a one-piece gun body 12 (which includes components to be described) to which is detachably secured a disposable nozzle 13. In the preferred embodiment, the gun is molded from polypropylene and the nozzle is molded from an ABS (Acrylonitrile-Butadiene-Styrene) plastic. While one of the objects of the invention is to provide an inexpensive dispensing gun achieved in part by molding gun body 12 and nozzle 13 from plastic, the invention in its broader sense is not limited to a dispensing gun molded from the particular plastics specified nor, in fact, is the invention limited to a dispensing gun manufactured from plastic.

Gun body 12 may be further defined as having integral portions including a longitudinally-extending valve portion 15 to which nozzle 13 is connected and terminating at a longitudinally-extending trigger portion 16, in turn, terminating at a longitudinally-extending spring portion 17 from which transversely extends a handle portion 18. Within gun body housing 12 is a pair of hose openings 22, 23, canted as shown, to which the "A" and "B" hoses (not shown) are attached, respectively, by conventional quick connect couplings or retaining mechanisms. Dispensing gun 10 is also provided with a trigger 20 extending within trigger body portion 16. It should be appreciated that when the operator grasps dispensing gun 10 about handle 18 for finger actuation of trigger 20, that the position of hose openings 22, 23 is such that the kit hoses will drape over the operator's forearm which surprisingly is preferred over other conventional hose attachment positions on the dispensing gun. For example, if the hose connections were attached to the handle bottom, it is possible for the hoses to become entangled with the operator's feet. If the hoses are attached to the rear end of the gun, the hoses rest on the operator's wrist. If the hoses are conventionally attached to the top of the gun, they can drape on either side of the gun and distort the pistol feel of the gun. Canting hose openings 22, 23 is thus believed to provide some ergonomic benefit while contributing to the improved performance of dispensing gun 10 as described below.

Figure 3:
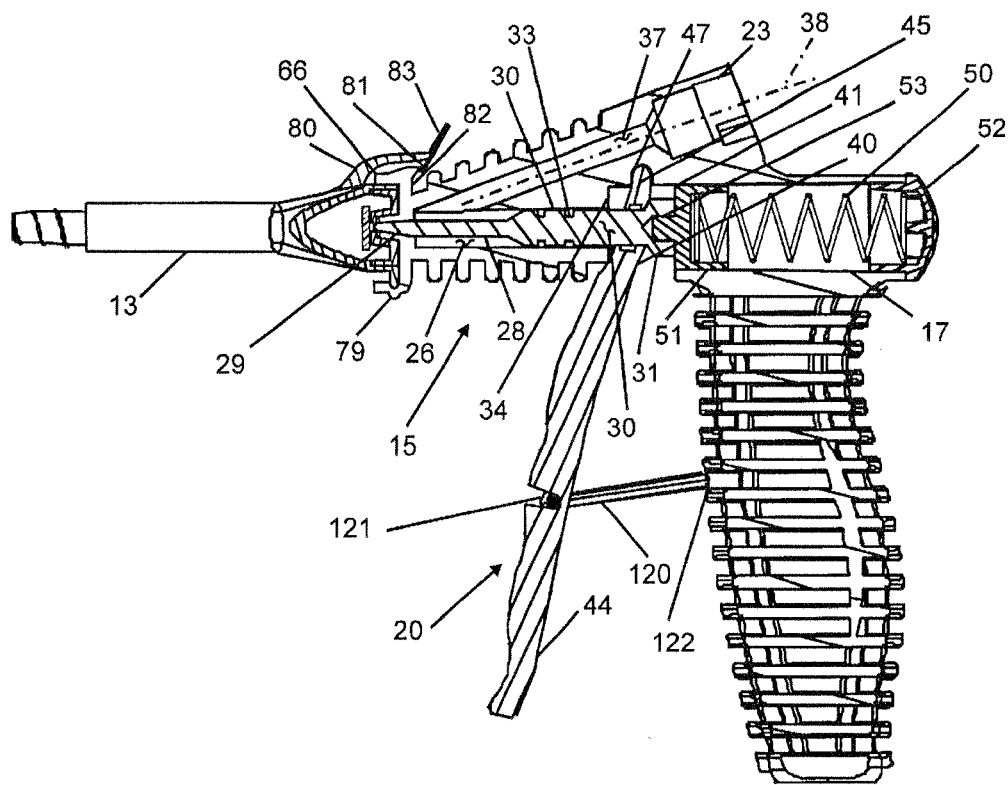
FIG. 3 is a section view of the dispensing gun of the present invention taken generally along line 3-3 of FIG. 1.
Figure 4:
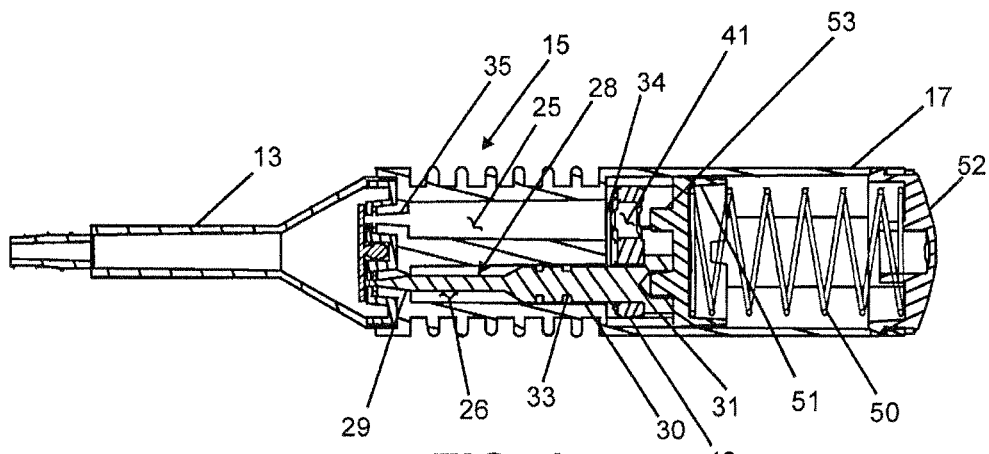
FIG. 4 is a section view of the dispensing gun of the present invention taken generally along line 4-4 of FIG. 2.

Referring now to FIGS. 3 & 4, dispensing gun 10 is shown in vertical and horizontal cross-section views, respectively, to best illustrate the overall relationship of the gun components. In gun body valve portion 15, there is formed a pair of parallel, open ended, laterally displaced and straight dispensing passages 25, 26 which are identical to one another so that a description of one dispensing passage such as a dispensing passage 25 for component "A" will apply to the other dispensing passage 26. Within each dispensing passage is placed a longitudinally-extending metering rod 28 and the metering rod for dispensing the "A" component in passage 25 is not shown in FIG. 4 for drawing clarity. Metering rod 28 will be defined in further detail below but generally has tip section 29 at one end terminating in an intermediate sealing section 30, in turn, terminating at a yoke collar section 31 at the opposite end of metering rod 28. Metering rod sections 29, 30 and 31 are cylindrical in the preferred embodiment but conceptually could be tubular. Each metering rod 28 has a pair of grooves 33 for an O-ring seal (not shown) to prevent the liquid component in dispensing passage 25 or 26 from escaping out end opening 34 in each dispensing passage 25, 26 through which intermediate sealing section 30 extends. The opposite end opening of each dispensing passage 25, 26 is formed as an especially configured valve seat 35 which will be explained in further detail below.

For consistency in terminology, when describing dispensing gun 10, "longitudinal" will refer to the direction of the dispensing gun along the long axis of dispensing passage 25, 26 of metering rods 28, i.e., x-x plane; "transverse" will refer to the direction of the gun along the long axis of handle portion 18, i.e., z-z plane; and, "laterally" will refer to the direction of the gun such as the distance spanning the spacing between dispensing passages 25, 26, i.e., the y-y plane.

Within valve body portion 15 are two laterally spaced and straight feed passages 37 in fluid communication at one end with a hose opening 22 or 23 and at the opposite end with a dispensing passage 25 or 26 at a position in a dispensing passage adjacent valve seat 35. Feed passage 37 extends along an axis 38 which forms an acute angle of about 20° with dispensing passage 25 or 26, preferably extending not greater than about 30°. The arrangement of feed passages 37, dispensing passages 25, 26 and metering rods 28 is believed to alleviate or reduce turbulent flow of the liquid components through dispensing gun 10.

Referring still to FIGS. 3 & 4, trigger 20 has a yoke crossbar portion 40 with a pair of elongated metering rod openings 41 formed therein through which intermediate sealing section 30 of each metering rod extends. Extending transversely from yoke crossbar portion 40 of trigger 20 in the direction of handle 18 is a recessed trigger lever 44. Transversely extending from the opposite side of yoke crossbar portion 40 is a rounded trigger pivot portion 45. Trigger pivot portion 45 fits within a U-shaped trigger recess 47 formed within trigger body portion 16. Trigger pivot portion 45 is not pinned or journaled within U-shaped recess 47 and can be viewed as floating. Movement of trigger lever 44 causes trigger pivot 45 to pivot within trigger recess 47 moving yoke crossbar 40 into contact with yoke collar section 31 of each metering rod 28 in a manner which causes metering of the "A" and "B" liquid components as will be described further below.

Within spring body portion 17 of dispensing gun 10, which is open ended, is positioned, a single spring 50. Spring 50 is compressed between an inner spring retainer 51 and an outer spring retainer 52 which perhaps, as best shown in FIG. 4, has a bayonet clip which snaps into openings in spring body portion 17. Inner spring retainer 51 has a pair of tubular projections 53 extending therefrom which fit within openings formed in the rear surface of yoke collar section 31. The design of inner spring retainer 51 thus provides a form of alignment assuring equal travel of each metering rod 28 in dispensing passages 25, 26. In conventional, two-component dispensing guns in commercial use, separate springs are provided for each metering rod (perhaps to provide different spring forces for each metering rod). As noted in the Background, the polyurethane foam or froth components under discussion are formulated to provide equal ratios of the "A" and "B" components. When separate springs are used, it is possible for one spring to set when compared to the other spring, tending to result in an off ratio dispensing gun. Two-component dispensing gun 10 of the present invention avoids this concern by using a single spring in combination with inner spring retainer 51 and yoke crossbar 40 of trigger 20 to assure that movement of trigger 20 will result in equal movement of both metering rods 28 in dispensing passages 25, 26. Equal ratio metering is mechanically forced and the single spring 50 exerts a constant force on both metering rods 28 so that binding within metering rod openings 41 of trigger crossbar portion 40 does not occur.

Dispensing gun 10 is easily assembled. Trigger 20 is inserted into gun body 12 such that trigger pivot portion 45 is within trigger recess 47. Each metering rod 28 is then inserted through spring body portion 17 into its dispensing passage 25 or 26. Inner spring retainer 51 is then inserted within spring body portion 17. Spring 50 is then inserted and compressed when outer spring retainer 52 is snapped by the bayonet clips into spring body portion 17.

Figure 5:
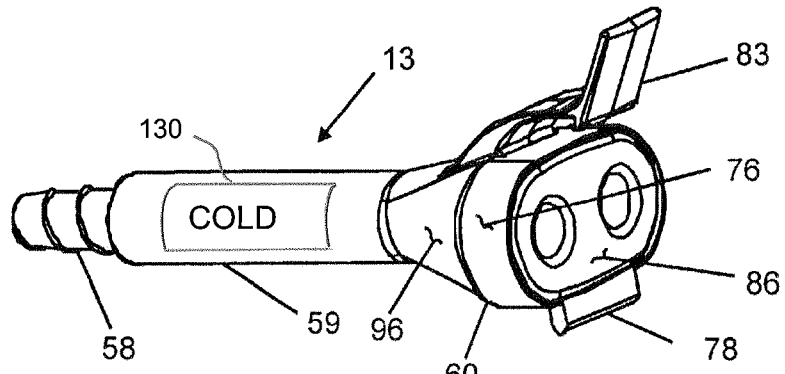
FIGS. 5 & 6 are perspective views of the nozzle.
Figure 6:
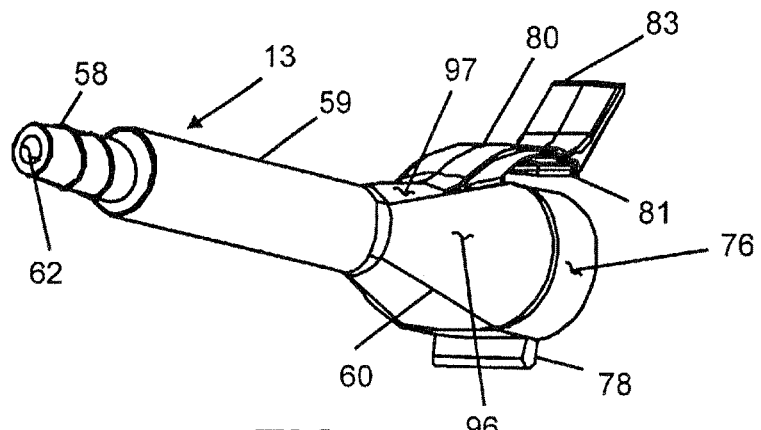
Figure 7:
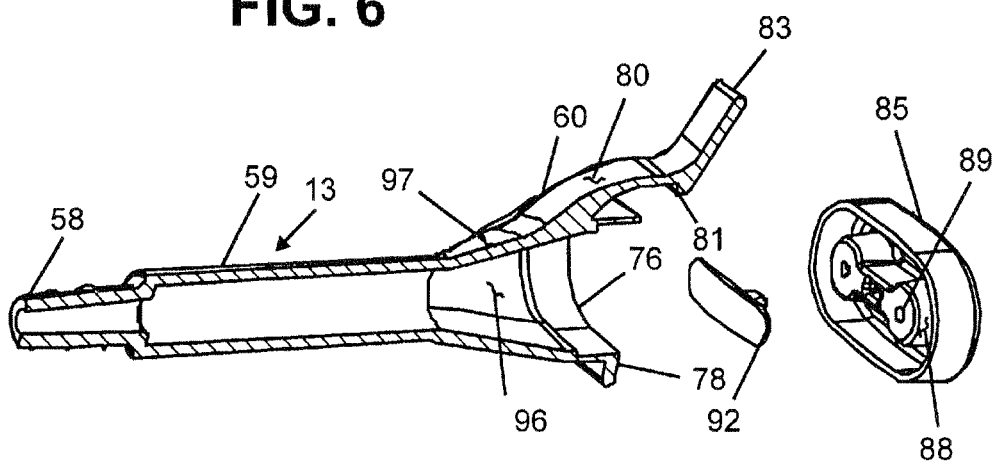
FIG. 7 is an exploded view of the nozzle shown in FIGS. 5 & 6.

Referring now to FIGS. 5, 6 & 7, nozzle 13 has an outlet tip section or outlet tip 58, a mixing chamber section or a mixing chamber 59 and an inlet chamber section or inlet chamber 60. Nozzle 13 is molded so that each section, 58, 59, 60 is an integral part of nozzle 13. However, dispensing tip 58 can be separately molded and threaded into mixing chamber 59 to permit a variety of differently shaped dispensing tips 58 to be fitted to nozzle 13. Alternatively, different tips may be threaded onto or into dispensing tip 58. Different gun application may require different spray patterns other than the conical spray pattern which will be produced through nozzle tip opening 62 provided in dispensing tip 58 of nozzle 13 shown in FIGS. 5-7. Making outlet tip 58 detachable from mixing chamber 59 such as by a threaded engagement, allows for a variety of spray patterns. Within mixing chamber 59, which is cylindrical, is a conventional static mixer (illustrated schematically in part as reference numeral 63 in FIG. 15).

Figure 15:
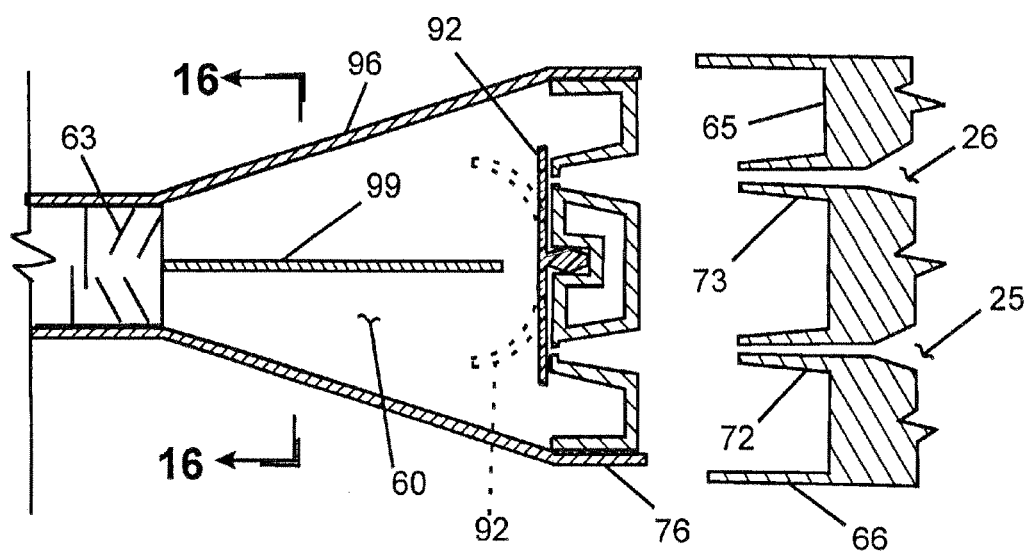
FIG. 15 is a schematic section view of an alternative embodiment of the nozzle of the present invention.
Figure 18:
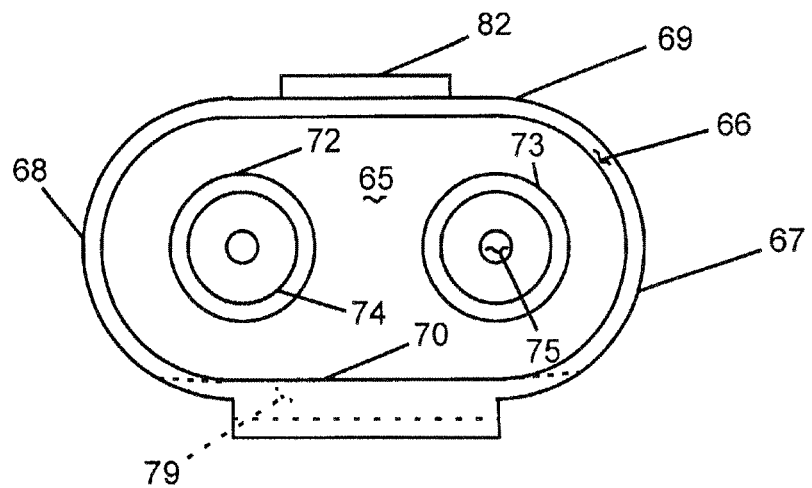

Nozzle design is essential to the proper functioning of any two-component dispensing gun. In accordance with the invention, inlet chamber 60 introduces the "A" and "B" components to static mixer 63 in a somewhat non-turbulent manner and with only minimal contact between the "A" and "B" components so that static mixer 63 can effectively perform its mixing function. More particularly, the shape, construction and relationship of inlet chamber 60 relative to dispensing passages 25, 26 and relative to mixing chamber 59 is important. Perhaps as best shown in FIGS. 15 & 18, to which reference should be had, dispensing passages 25, 26 exit valve gun portion 15 at a flat nose surface 65 in valve body portion 15. Flat nose surface 65 is defined by an edge from which an edge lip 66 protrudes. Edge lip 66, in the preferred embodiment, is defined by two identical, laterally spaced semi-circular edge portions 67, 68 connected to one another by laterally extending straight edge portions 69, 70 transversely spaced from one another. Alternatively, and somewhat conceptually preferable, edge lip 66 could be circular.

Longitudinally-extending from nose surface 65 and concentric with semi-circular edge lip portion 67, 68 are a pair of valve seat protrusions 72, 73 forming or continuing the metering tip valve seats of dispensing passages 25, 26 respectively. Each valve seat protrusion 72, 73 has a flat end surface 74 through which a central valve seat opening 75 extends. Valve seat opening is the minor diameter of a frustoconical surface which defines valve seat 35 in the preferred embodiment.

Referring again to FIGS. 5, 6 & 7, inlet chamber 60 of nozzle 13 has a collar section 76 extending from its entrance end which is in the shape of nose edge and fits within nozzle edge lip 66. Extending laterally and transversely from the bottom portion of collar section 76 is a positioning tab 78. When nozzle 13 is applied to dispensing gun 10, positioning tab 78 fits within a nozzle recess 79 best shown as extending between dash lines in FIG. 18 and shown in cross-section in FIG. 3. Extending transversely upward from collar section 76 is a latch 80 which has a lock surface 81 adapted to engage a snap ledge 82 longitudinally-extending from nose edge lip 66 in the rearward direction perhaps as best shown in FIG. 3. To apply, the gun operator grasps nozzle 13 by its outlet tip 58 and mixing chamber 59 and inserts positioning tab 78 into nozzle recess 79. At this point, nozzle 13 will be at a slight downward angle relative to gun nose surface 65. As the remaining portion of collar section 76 is brought within edge lip 66, positioning tab 78 will rotate within nozzle recess 79 so that snap ledge 82 will snap into locking engagement with lock surface 81. To remove nozzle 13, the gun operator depresses latch tip 83 formed in latch 80 to unseat lock surface 81 on snap ledge 82. Nozzle 13 can then be rotated so that positioning tab 78 can be lifted from nozzle recess 79. The latch mechanism described in the preferred embodiment is particularly preferred because the rigidity of latch 80 can be designed in combination with the lever force exerted by the operator to achieve desired sealing of nozzle 13 to gun body 12. However, other arrangements which will produce desired sealing can be employed. In particular, collar section 76 of nozzle 13 and edge lip 66 of gun nose surface 65 can be made circular and provided with a mason jar lid type thread. The pitch of the thread can be established to produce the desired sealing in less than 360° of rotation. Still another mechanism for attaching nozzle 13 to gun body 12 would be to simply provide the nozzle with opposing bayonet clips which would snap into recesses or clip holders foamed into gun body 12 adjacent nose surface 65 or vice-versa. Thus, in its broader sense, the invention contemplates attaching nozzle 13 to gun body 12 in a sealing manner either through pivoting such as shown by latch 80, or by rotation such as by a threaded connection or by a straight, snap in connection such as achieved by bayonet type clips.

Referring now to FIGS. 7, 8, 9 & 10, backplate 85 having an edge configuration similar to collar section 76 is permanently affixed to collar section 76 of nozzle 13. Backplate 85 is "glued" to nozzle collar section 76 and is sealed thereto about its entire periphery. Because nozzle 13, in the preferred embodiment, is an ABS plastic, it lends itself to "solvent welding" with a variety of common solvents. Backplate 85 has a forward surface 86 and a rearward surface 87 shaped as shown to provide a pair of cup shaped recesses 88 opening to nozzle face surface 65. At the base of each cup shaped recess 88 is a valve extension opening 89 and a sealing rib 90 extends from the base of cup shaped recess 88 circumscribing valve seat extension opening 89. Sealing rib 90 thus contacts flat end surface 74 of each valve seat protrusion when nozzle 13 is latched to gun body 12. Because the plastic composition of nozzle 13 has a different hardness than the plastic composition of body 12, a deformation will occur between sealing lip 90 and flat end surface 74 with the positive lock nozzle arrangement described above. In the preferred embodiment, nozzle 13 is harder than the plastic of gun body 12 so that sealing lip 70 will deform flat end surface 74 to effect sealing of nozzle 13 to gun body 12. However, the deformation from sealing is not beyond the memory of the plastic so that permanent set is not experienced in the gun body and any number of nozzles can be repeatedly sealed to gun body 12. Nozzle sealing conventionally occurs in commercial applications by means of conventional O-rings and like resilient seals.

Referring now to FIGS. 7, 8, 11 & 12, a resilient strip 92 of flexible material such as any number of plastics (ABS is used in the preferred embodiment) or natural or synthetic rubber or similar elastomers is secured to rear surface 87 of backplate 85 by an attachment portion 93 wedged into centrally positioned attachment recess 94 formed in backplate 85 and opening to rearward surface 87 thereof. Resilient strip 92 as best shown in FIG. 4 extends over to cover valve seat extension openings 89. Resilient strip 92 acts as a flapper valve to prevent crossover. When dispensing gun 10 is operated, pressure of the "A" and "B" liquid components will force resilient strip 92 to flex away from valve seat extension openings 89 to a flex position such as shown by the dash lines in FIG. 15. Should one of the components significantly drop in pressure, so that the pressure in nozzle inlet chamber 60 is greater than the pressure in one of the dispensing passages 25, 26, the resilient strip 92 will cover that dispensing passage's valve seat extension opening 89. This provides an effective one way valve positively sealing dispensing passages 25 and 26 in the event a cross-over condition occurs. Preferably, a single resilient strip 92 as shown is utilized. However, each valve seat extension opening 89 can be provided with its own separate resilient strip of material 92. It must be noted that the flexibility of resilient strip 92 is a design variable. It is believed that resilient strip 92 aids in the fine metering characteristics of dispensing gun 10. As already noted, dispensing gun 10 is provided with a plurality of nozzles 13 having various outlet tip 58 configurations suitable for specific applications. In those applications requiring a small bead of polyurethane foam to be applied such as in a window frame sealant application, a nozzle having a relatively long outlet tip 58 with a narrow opening 62 is provided with a stiffer resilient strip 92 then that which may be provided in a universal nozzle provided with the kit. Still further, there are applications where full flow of the gun is required. For example, mining applications which use polyurethane foam to seal shaft "doors" or "bulkheads" in mine shafts in the event of a fire require the dispensing gun to meter the components at very high dispensing rates. In such applications, nozzle 13 would be supplied without resilient strip 92.

The choice of flexibility or rigidity of resilient strip 92 is believed to be a factor also with respect to "post" drip which is foam dripping from outlet tip 58 when dispensing gun 10 is stopped. To some extent post drip is inherent and will always occur because the components within static mixer of mixing chamber began to react and force the foam from outlet tip 58. It is believed that, depending on the rigidity of resilient strip 92, a seal can be additionally maintained at valve seat extension opening 89. The rigidity of resilient strip 92 has to be balanced against gun performance so that full flow performance is not adversely affected. However, to the extent resilient material 92 snaps back into contact with valve seat extension opening 89, some additional sealing assistance in alleviating post drip may be present.

Referring still to FIGS. 5, 6 & 7, it can be seen that the cross-sectional area of nozzle 13 at its entrance end, i.e., collar 76 is greater than the cross-sectional area of inlet chamber 60 at its exit end, i.e., the intersection with mixing chamber 59. The nozzle wall forming inlet chamber 60 has semi-circular portions 96 corresponding to nose edge surfaces 67, 68 which take the shape of truncated cones as the nozzle extends from its entrance to its exit end. Similarly, the wall forming nozzle chamber 60 also has top and bottom flat portions 97 corresponding to nose straight edge surfaces 69, 70 which assume a triangular shape as inlet chamber 60 transitions from its entrance to its exit end. Generally speaking, inlet chamber 60 is in the shape of a funnel or a truncated cone. This configuration is believed to result in a somewhat smooth flow of the "A" and "B" liquid components into mixing chamber 59 as they travel through inlet chamber 60 after exiting valve seat extension openings 89. That is, significant mixing or contact of the "A" and "B" components does not occur white components are flowing through inlet chamber 60. In this regard, reference can be had to FIG. 15 in which it can be seen that the flexure of resilient strip 92 will direct components "A" and "B" away from one another towards semi-circular portions 96 of inlet chamber 60. It is, of course, understood that some quantity of the "A" and "B" components will contact one another at the center of inlet chamber 60. It is not believed that the contact is detrimental to the gun operation because the flow within inlet chamber 60 is somewhat non-turbulent. Contact at the nozzle center will thus occur at a somewhat laminar flow condition while the components are directed into static mixer 63. Further, there may be some benefit to a slight mixing contact just prior to entering mixing chamber 59. The geometry of the centrally positioned valve seat protrusions 72, 73, within nozzle inlet chamber 60 which is frustoconical in combination with resilient strip 92 provides a generally smooth, somewhat, non-turbulent flow of the "A" and "B" components, maintained somewhat separately, to the inlet of static mixer 63. The flow does not experience any impingement against corners or dead end against any flat wall surfaces. Thus, the non-turbulent type flow of the "A" and "B" components within gun body 12 is carried through nozzle 13.

It is to be appreciated that the interaction between the "A" and "B" components within nozzle 13 are complex. Further, the words "laminar" and "turbulent" are not used herein in their strict, classical sense but are used in a relative sense. Inlet chamber 60 is believed to be relatively "quiescent".

Figure 16:
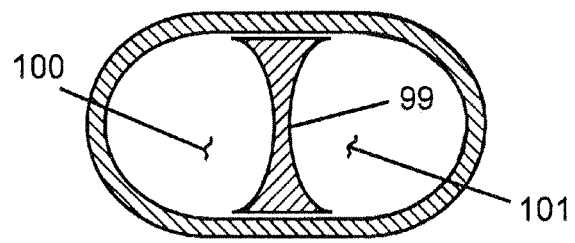
FIG. 16 is a section view of the nozzle taken along lines 16-16 of FIG. 15.

FIGS. 15 & 16 illustrate an alternative embodiment to nozzle 13 which can be utilized for applications requiring fine metering of the "A" and "B" components. In the alternative embodiment illustrated, a central wall 99 is provided. Central wall 99 extends from static mixer 63 to a distance short of resilient strip 92 so as not to affect flexure of resilient strip 92. While wall 99 could be a flat, straight wall, it is preferred that the wall be curved such as shown in FIG. 16 providing two truncated cone "A" and "B" component passage ways 100, 101 in nozzle inlet chamber 60. Truncated cone passageways 100, 101 positively assure generally non-turbulent liquid component flow until the components reach static mixer 63, which as noted above, enhance the metering characteristics of dispensing gun 10. While wall 99 does not divide the nozzle into two separate compartments as in the known prior art nozzles, wall 99 serves to maintain the components separate at the inlet of mixing chamber 59. The funneling nature of nozzle inlet chamber 60 is enhanced. While tests have not been conducted, some improvement in the "clogging" time is expected, and where the wall is curved, the possible adverse effects at very high flow may be somewhat alleviated.

Figure 13A:
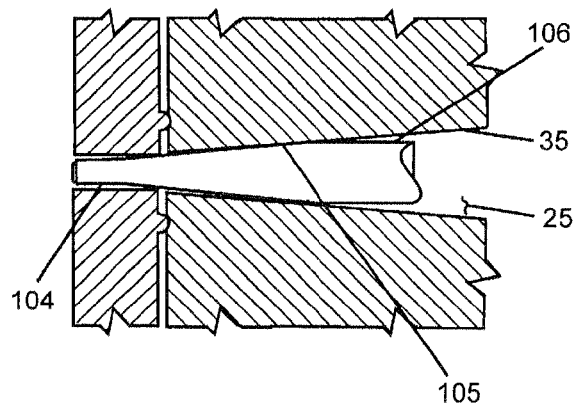
FIGS. 13A, 13B, & 13C are schematic elevation views illustrating various positions of the metering rod in the valve seat of the gun.
Figure 13B:
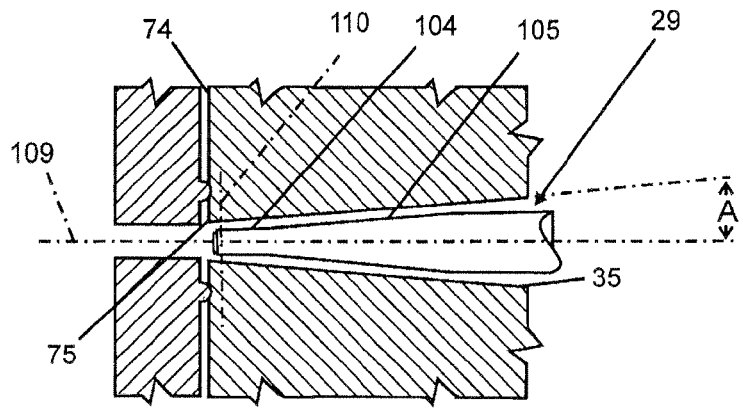
Figure 13C:
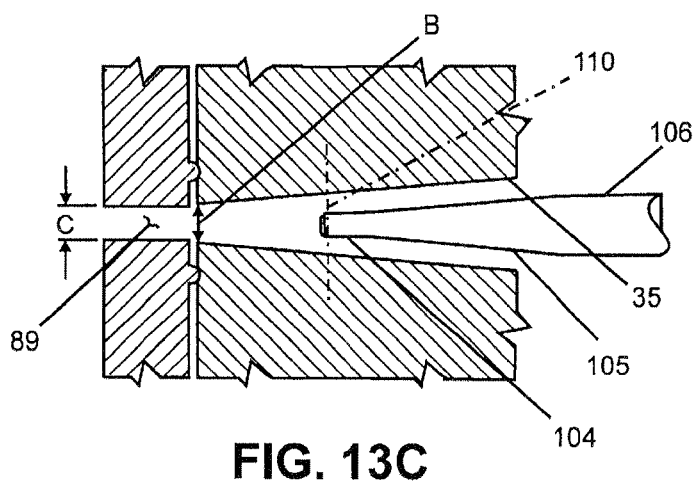

Referring now to FIGS. 13A, 138, & 13C, tip section 29 of each metering rod 28 has a cylindrical tip portion 104 at its end terminating in a truncated cone or frustoconical portion 105 which in turn terminates in a larger cylindrical portion 106 which intersects with intermediate sealing section 30. Metering tip section 29 as thus defined is conventional and is traditionally used in one-component dispensing guns and also used in two-component guns, although, when used in two-component guns, the metering tip has been used in combination with other valves.

Valve seat 35 is a frustoconical or truncated cone seat. Both frustoconical valve seat 35 and truncated cone metering rod portion 105 form the same angle with longitudinal centerline 109 of each dispensing passage 25, 26 designated by reference arrow "A" in FIG. 138. For reasons which will be discussed, truncated cone angle A is not to exceed about 10°. Frustoconical valve seat 35 reduces to a minimum at valve seat opening 75 in flat end surface 74 designated by reference letter B in FIG. 13C which is the minor diameter of the frustoconical surface forming valve seat 35. Diameter B is slightly larger than the outside diameter of cylindrical tip portion 104. In the preferred embodiment of the invention, valve seat extension opening 89 is cylindrical and has a diameter indicated by reference letter C in FIG. 13C which is equal to or greater than diameter B. However, in an alternative embodiment of the invention, diameter C is less than diameter B (but still greater than metering rod cylindrical tip portion 104) and can extend for some slight distance (i.e., ⅛" to ¼") into valve seat 35 before the valve seat assumes its conical configuration.

Each dispensing passage 25, 26 is sealed when truncated cone portion 105 of metering rod 28 seats against frustoconical valve seat 35 as shown in FIG. 13A. When metering rod 28 initially is pulled rearward in dispensing passage 25 or 26, the annular clearance space which exists between cylindrical tip portion 104 and valve seat extension opening 89 can function as the metering orifice and remains relatively constant until nozzle tip portion 104 exits valve seat extension opening 89 such as shown in FIG. 138. When metering rod 28 is retracted to positions as shown in FIGS. 138 & 13C, metering occurs at the distance or clearance (i.e., orifice) between the end of metering tip portion 104 and frustoconical valve seat 35, generally in the annular space occupied by dot-dash lines 110 in FIGS. 138 & 13C (technically dot-dash lines are perpendicular to frustoconical valve seat 35). Specifically, the smallest (diametrical) opening, whether in valve seat extension opening 89 (designated by reference letter "C" in FIG. 13C) or in frustoconical valve seat 35 (designated by reference letter "B" in FIG. 13C) is larger in area than the clearance between cylindrical tip portion 104 and frustoconical valve seat 35 lying generally along dot-dash line 110 throughout the travel of metering rod 28 (between full open and close portions of trigger lever 44). If valve seat extension opening "C" 89 is sized significantly larger than the minimum diametrical opening of frustoconical valve seat 75, (reference letter "B"), variable metering will occur once cylindrical tip 104 clears "B". If, in an alternative embodiment of the invention, valve seat extension opening "C" 89, (and the extension of "C" into the frustoconical valve seat 35) is sized smaller than the minor diameter of frustoconical valve seat 35 (i.e., the frusto-conical surface thereof), a somewhat constant "fine" metering of the components will occur until the end of cylindrical tip portion 104 reaches the frustoconical surface of frustoconical valve seat 35.

Dimensionally the areas of cylindrical tip portion 104, the truncated cone angle of metering rod 28 and frustoconical valve seat 35 (reference letter "A" less than 1020), and the minor diameter of frustoconical valve seat 35 (reference letter "B") are selected so that the minimum annular clearance between cylindrical tip portion 104 and frustoconical valve seat 35 at the fully retracted position of metering rod 28, i.e., full open, is equal to or less than the minimum diametrical opening 75 of frustoconical valve seat 35, i.e., reference letter "B". In the preferred embodiment, the fully open portion of dispensing gun 10 establishes an orifice between metering rod cylindrical tip portion 104 and frustoconical valve seat 35 of about 94-96% of the area of valve seat opening 75, defined, in the preferred embodiment as the minor diameter of frustoconical valve seat 35. This relationship allows variable metering of the gun throughout its travel range. In all cases, metering rod tip portion 104 is within the frustoconical surface of frustoconical valve seat 35 and functions as the orifice. Valve seat extension opening 89, in the preferred embodiment, is sized greater than minimum frustoconical diameter "B". In the alternative embodiment, the diameter of valve seat extension opening "C" is sized equal to or less than minimum frustoconical diametrical opening "B" for generally constant fine metering of the gun over an initial travel. In both embodiments, variable progressive metering occurs when cylindrical tip portion 104 is within the frustoconical surface of valve seat 35.

Dispensing gun 10 of the present invention exhibits excellent metering characteristics throughout its range of travel. Without wishing to be bound by any theory of operation, it is believed the arrangement described is especially advantageous for polyurethane foam in which chemical components, such as fluorocarbons, expand from a liquid to a gaseous state at defined pressures for a given temperature. In particular, a pressure gradient exists about the variable orifice which, as defined, is the minimum distance between the frustoconical surface of frustoconical valve seat 35 and cylindrical tip portion 104 of metering rod 28. As the orifice opens the gradient expands increasing the distance whereat state change of the chemical occurs. This result, in turn, increases the backpressure exerted by the components on the orifice as the gun is increasingly opened. This increase in backpressure is believed to partially account for the improved metering of dispensing gun 10 especially at higher flow conditions. Thus, dispensing gun 10 of the present invention is able to dispense the components at slow flow rates and controllably meter the components at high or full rates at the limits of the gun's travel.

It should be noted that the length of cylindrical tip portion 104 is not especially significant, about 1/8" in the preferred embodiment. While most dispensing guns employ some form of a pivot arm arrangement for the gun's trigger, and the travel of any pivoting lever can be increased by increasing the lever length, there is a limit to the lever length and it is desirable to provide some form of increased motion for the gun's trigger when fine metering of the "A" and "B" components is desired, whether the fine metering is progressively variable as in the preferred embodiment or constant for a fixed travel length as in the alternative embodiment.

Figure 14A:
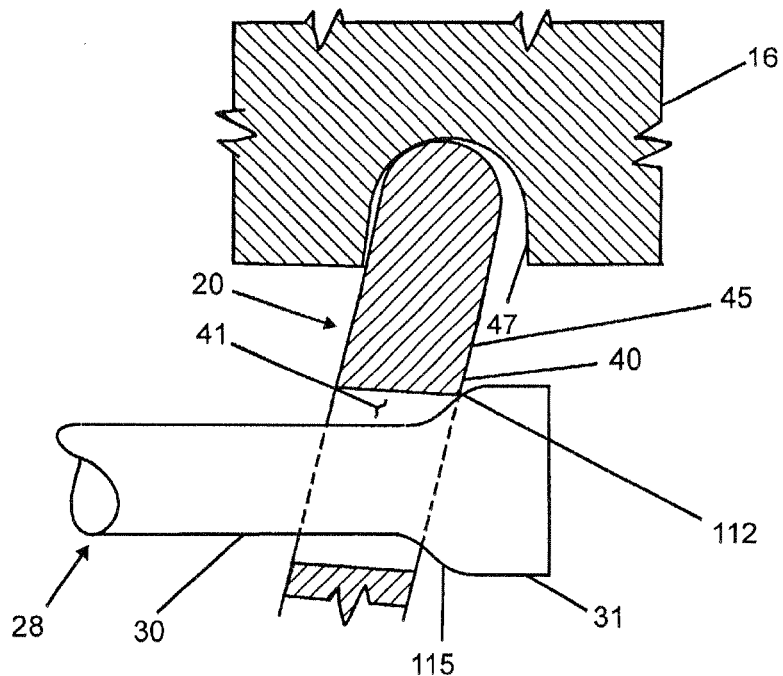
FIGS. 14A & 14B are schematic partially sectioned views indicating the position of the metering rod and trigger during operation of the dispensing gun of the present invention.
Figure 14B:
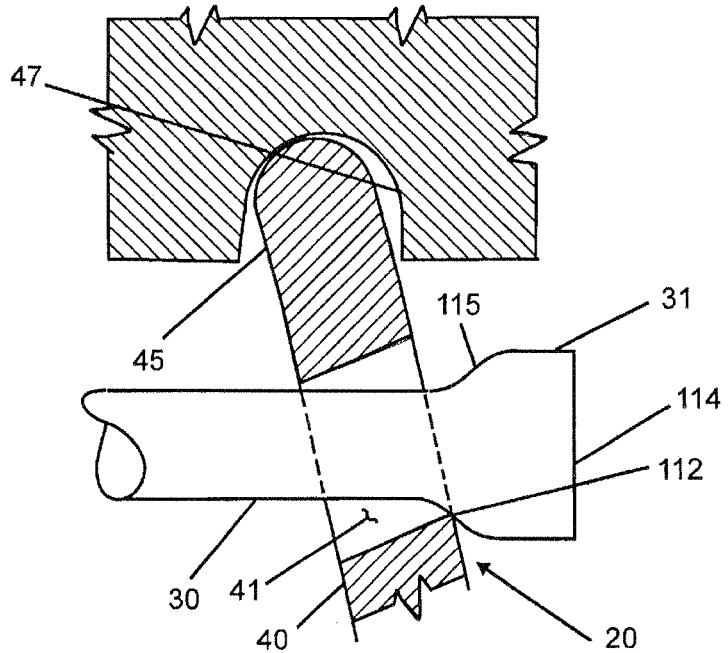

Referring now to FIGS. 14A & 14B, there is shown a pivoting arrangement used in dispensing gun 10 which provides increased travel of trigger 20 to enhance fine metering of dispensing gun 10 while also providing increased control of dispensing gun 10 at full flow conditions. Trigger body portion 16 as noted has a U-shaped trigger recess 47 formed therein. Trigger pivot portion 45 of trigger 20 simply fits within U-shaped recess 47 and because the curved portion of trigger pivot 45 is a sharper radius than that of trigger recess 47 there is some translational movement of trigger 20 when trigger lever 44 is moved such as shown when comparing the relative trigger positions of FIGS. 14A & 14B. Thus, trigger pivot 45 is not fixed in the sense of being pinned or journaled within a fixed pivot. While spring 50 will maintain the curved surfaces together in rolling contact there will be some translation which is believed to assist in lever travel at the travel limits. Yoke crossbar portion 40 of trigger 20 at its intersection with elongated metering rod opening 41, makes a line contact 112 with yoke collar section 31 of metering rod 28. Yoke collar section 31 of metering rod 28 has a flat spring base surface 114 at its end, i.e., the end of metering rod 28, and an annular surface 115 at the intersection of intermediate sealing section 30 with yoke collar section 31. Annular surface 115 is chamfered (as a straight line) or curved or formed as a compound curve such as the S-shaped curve shown in FIGS. 14A & 14B, to provide a camming surface for crossbar line contact 112. Forming annular surface 115 as a camming surface allows increased motion of trigger lever 44 at the limits of longitudinal travel of metering rod 28. The increased motion allows for better operator control and gun feel for fine and full open metering applications.

Figure 17:
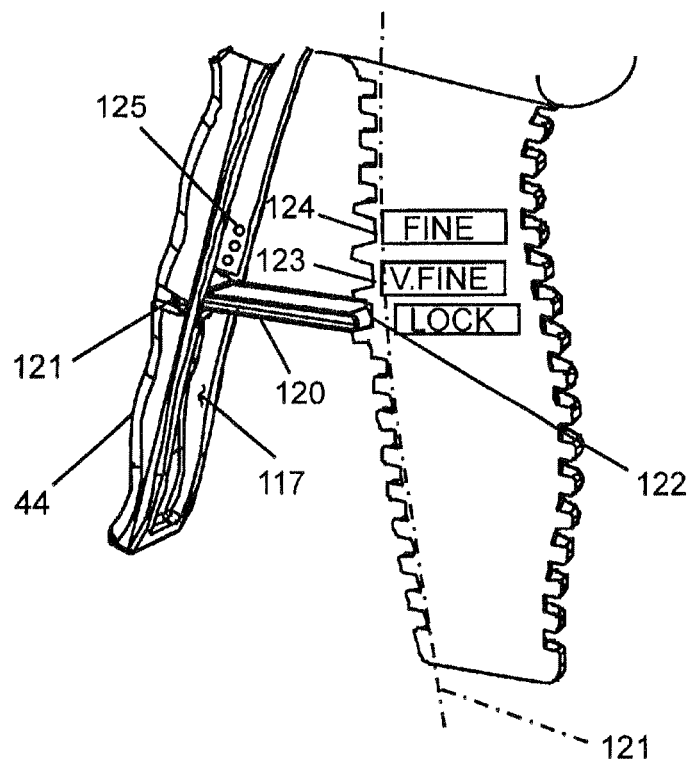
FIG. 17 is an elevation view of the handle and trigger portions of the dispensing gun showing grooves for the lock tab of the dispensing gun; and, FIG. 18 is a front view of the nose surface of the dispensing gun of the present invention.

Referring now to FIGS. 1, 3 & 17 (in which handle body portion 18 has been "sliced" to better illustrate the invention) trigger lever 44 is formed with a trigger lever recess 117 which faces or opens to handle body portion 18. Within trigger lever recess 117 is lock tab 120 which at one end has ears 121 snapped into openings formed in trigger lever 44 so that lock tab 120 is pivotal into and out of trigger lever recess 117. Handle body portion 18 has its surface which faces trigger lever 44 in the form of a curve or arc indicated by dot-dash line 121 in FIG. 17 from which a series of indentations forming grooves are formed. In particular, one groove is formed as a locking groove 122 into which lock tab 120 is positioned as shown in FIGS. 1-3 and at which trigger 20 is locked to render the gun inoperable. In accordance, however, with the fine metering aspects of the invention, additional grooves 123 and 124 are also provided which allow some motion of trigger lever 44 until locking tab seats in the groove. In accordance with the preferred embodiment, grooves 123, 124 provide a fixed stop corresponding to a fixed orifice size between cylindrical tip portion 104 of metering rod 28 and frustoconical valve seat 35. In accordance with the alternative embodiment, (smaller orifice "C") very fine metering groove 123 establishes a generally constant, very fine metering stop. In order to provide positive placement of lock tab 120, bumps or protrusions 125 can be formed within trigger lever recess 117 at which lock tab 120 assumes a pivoted position engaging the intended locking groove.

Referring back to FIG. 5, the ability to determine the chemical temperature as it exits the "A" and "B" cylinders through respective "A" and "B" flexible plastic hoses (not shown) or the ability to determine the chemical temperature as it enters and/or exits disposable nozzle 13 is effected either by having a thermochromic material contained within the plastic used to mold disposable nozzle 13 or to fabricate the flexible plastic hoses. Still another approach involves affixing label 130 either permanently using a permanent adhesive or non-permanently, using a pressure-sensitive adhesive (the label optionally having thermochromic text or thermochromic graphic material printed thereupon) which changes in one instance from colored (below the recommended use temperature, illustrated by the text "Cold" in the figure), to colorless or a different color when the chemicals have transferred a sufficient amount of heat to the nozzle or label.

Thermochromism is typically implemented via one of two common approaches: liquid crystals and leuco dyes. Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 μm (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxy-fluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3,3'-bis(p-dimethyl-aminophenyl)phthalide, 3,3-bis(p-diethylamino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenylphenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonyl-benzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. to transparent or translucent above 60° F. If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye. When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined in order to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color.

In addition to the above, it should be understood that many alterations and permutations are possible. Any of a variety of colors and shades can be mixed in order to undergo color changes as a function of temperature.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A two-component spray gun comprising:

a housing having a pair of inlet openings positioned on top of said housing for insertion of an "A" and a "B" flexible plastic hose from respective "A" and "B" cylinders containing pressurized chemicals and a propellant therein, the pressurized chemicals and propellant used to prepare a polyurethane foam or a polyurethane froth, each "A" and "B" cylinder at a pressure between approximately 150-250 psi;

said housing having a metering valve disposed within said housing;

said housing having a removable plastic spray nozzle affixed to a front of said housing for dispensing the polyurethane foam or the polyurethane froth, said plastic spray nozzle comprising at least one thermochromic material disposed within or affixed thereupon said plastic nozzle;

said thermochromic material changing color by measuring the temperature of either the high volume flow of pressurized chemicals or high volume flow of synthesized froth foam or both egressing through said plastic nozzle to illustrate to the end-user of the spray gun if the pressurized chemicals and propellant used to prepare the polyurethane foam or the polyurethane froth are at a minimum temperature for proper chemical cure of the "A" and "B" chemicals, the propellant comprising a fluorocarbon and an inert gas in which the propellant enters into the nozzle as a liquid component under the pressure of between approximately 150-250 psi and changes to a gaseous state component during travel through the nozzle and egress therefrom into the environment with turbulent flow between the liquid components, gaseous components and synthesized froth foam; and said nozzle having a pressure gradient between a variable orifice, said orifice being a minimum distance between a valve seat and a cylindrical tip portion of a metering rod, which as the orifice opens, the gradient expands increasing a distance at which the phase change occurs which increases a backpressure in the nozzle, which at least partially improves metering of dispensing at high flow conditions and displaying a color change in dependence upon temperature of the high volume flow of pressurized chemicals or high volume flow of synthesized froth foam or both.

2. The spray gun of claim 1 wherein
said at least one thermochromic material is a liquid crystal or a leuco dye.

3. The spray gun of claim 1 wherein
said thermochromic material is affixed upon said plastic nozzle by a label containing said thermochromic material.

4. The spray gun of claim 1 wherein
said at least one thermochromic material is at least two thermochromic materials disposed within or thereupon said nozzle, each of said at least two thermochromic materials effecting a color change at a different temperature.

5. The spray gun of claim 4 wherein
said at least one thermochromic material is at least three thermochromic materials disposed within or thereupon said nozzle, each of said at least three thermochromic materials effecting a color change at a different temperature.

6. The spray gun of claim 1 wherein
at least one of said "A" and "B" plastic hoses affixed to said housing of said spray gun comprise at least one thermochromic material disposed within or affixed thereupon said at least one plastic hose.

7. The spray gun of claim 6 wherein
said at least one thermochromic material is a liquid crystal or a leuco dye.

8. The spray gun of claim 6 wherein
said thermochromic material is affixed upon at least one of said plastic hoses by a label containing said at least one thermochromic material.

9. The spray gun of claim 6 wherein
said at least one thermochromic material is at least two thermochromic materials disposed within or thereupon said at least one plastic hose, each of said at least two thermochromic materials effecting a color change at a different temperature.

10. The spray gun of claim 9 wherein
said at least one thermochromic material is at least three thermochromic materials disposed within or thereupon said at least one plastic hose, each of said at least three thermochromic materials effecting a color change at a different temperature.

11. A process to determine if pressurized chemicals used to make a two-component polyurethane froth foam are at or above an acceptable use temperature range, the process comprising:

using a spray gun having a nozzle comprising at least one thermochromic material contained therein or affixed thereupon, the nozzle dispensing pressurized chemicals and propellant used to prepare the polyurethane froth foam, the pressurized chemicals and propellant at a pressure between approximately 150-250 psi;

said thermochromic material changing color by measuring the temperature of either the high volume flow of pressurized chemicals or high volume flow of synthesized froth foam or both egressing through said nozzle to illustrate to an end-user of the spray gun if the pressurized chemicals and propellant used to prepare the polyurethane froth foam are at a minimum temperature for proper chemical cure of the pressurized chemicals and propellant used to synthesize the polyurethane foam by visually watching the color of the nozzle, the propellant comprising a fluorocarbon and an inert gas in which the propellant enters into the nozzle as a liquid component under the pressure of between approximately 150-250 psi and changes to a gaseous state component during travel through the nozzle and egress therefrom into the environment with turbulent flow between the liquid components, gaseous components and synthesized froth foam; and said nozzle having a pressure gradient between a variable orifice, said orifice being a minimum distance between a valve seat and a cylindrical tip portion of a metering rod, which as the orifice opens, the gradient expands increasing a distance at which the phase change occurs which increases a backpressure in the nozzle, which at least partially improves metering of dispensing at high flow conditions and displaying a color change in dependence upon temperature of the high volume flow of pressurized chemicals or high volume flow of synthesized froth foam or both.

12. The process of claim 11 which further comprises:
using at least one "A" or "B" side hose comprising at least one thermochromic material contained therein or affixed thereupon.

13. The spray gun of claim 1 wherein
said thermochromic material changes color from blue when the temperature is below the minimum temperature to transparent or translucent above the minimum temperature.

14. The spray gun of claim 13 wherein
the minimum temperature is approximately 60° F.

15. The spray gun of claim 13 wherein
the polyurethane foam or polyurethane froth are insulating.

16. A two-component spray gun comprising:
a housing having a pair of inlet openings positioned on top of said housing for insertion of an "A" and a "B" flexible plastic hose from respective "A" and "B" cylinders containing pressurized chemicals and a propellant therein, the pressurized chemicals and propellant used to prepare an insulating polyurethane foam or an insulating polyurethane froth, each "A" and "B" cylinder at a pressure between approximately 150-250 psi;
said housing having a metering valve disposed within said housing;
said housing having a removable plastic spray nozzle affixed to a front of said housing for dispensing the polyurethane foam or the polyurethane froth, said plastic spray nozzle comprising at least one thermochromic material disposed within or affixed thereupon said plastic nozzle; and
said thermochromic material changing color by measuring the temperature of either the high volume flow of pressurized chemicals or the high volume flow of synthesized froth foam or both egressing through said plastic nozzle to illustrate to the end-user of the spray gun if the pressurized chemicals and propellant used to prepare the polyurethane foam or the polyurethane froth are at a minimum temperature for proper chemical cure of the "A" and "B" chemicals, the propellant comprising a fluorocarbon and an inert gas in which the propellant enters into the nozzle as a liquid component under the pressure of between approximately 150-250 psi and changes to a gaseous state component during travel through the nozzle and egress therefrom into the environment with turbulent flow between the liquid components, gaseous components and synthesized froth foam; and
said nozzle having a pressure gradient between a variable orifice, said orifice being a minimum distance between a valve seat and a cylindrical tip portion of a metering rod, which as the orifice opens, the gradient expands increasing a distance at which the phase change occurs which increases a backpressure in the nozzle, which at least partially improves metering of dispensing at high flow conditions and displaying a color change in dependence upon temperature of the high volume flow of pressurized chemicals or high volume flow of synthesized froth foam or both.

17. The spray gun of claim 16 wherein
said at least one thermochromic material is a liquid crystal or a leuco dye.

18. The spray gun of claim 16 wherein
said thermochromic material is affixed upon said plastic nozzle by a label containing said thermochromic material.

19. The spray gun of claim 16 wherein
said at least one thermochromic material is at least two thermochromic materials disposed within or thereupon said nozzle, each of said at least two thermochromic materials effecting a color change at a different temperature.

20. The spray gun of claim 19 wherein
said at least one thermochromic material is at least three thermochromic materials disposed within or thereupon said nozzle, each of said at least three thermochromic materials effecting a color change at a different temperature.

21. The spray gun of claim 16 wherein
at least one of said "A" and "B" plastic hoses affixed to said housing of said spray gun comprise at least one thermochromic material disposed within or affixed thereupon said at least one plastic hose.

22. The spray gun of claim 21 wherein
said at least one thermochromic material is a liquid crystal or a leuco dye.

23. The spray gun of claim 21 wherein
said thermochromic material is affixed upon at least one of said plastic hoses by a label containing said at least one thermochromic material.

24. The spray gun of claim 21 wherein
said at least one thermochromic material is at least two thermochromic materials disposed within or thereupon said at least one plastic hose, each of said at least two thermochromic materials effecting a color change at a different temperature.

25. The spray gun of claim 24 wherein
said at least one thermochromic material is at least three thermochromic materials disposed within or thereupon said at least one plastic hose, each of said at least three thermochromic materials effecting a color change at a different temperature.

26. The spray gun of claim 16 wherein
said thermochromic material changes color from blue when the temperature is below the minimum temperature to transparent or translucent above the minimum temperature.

27. The spray gun of claim 26 wherein
the minimum temperature is approximately 60° F.

28. A color-changing plastic spray gun nozzle which comprises:
an tapered elongated cylindrical bore having a static mixer disposed therein, said cylindrical bore having an entrance collar at one end and an opposed exit end;
said color-changing plastic spray nozzle dispensing a pressurized polyurethane foam or a polyurethane froth, said plastic spray nozzle comprising at least one thermochromic material disposed within or affixed thereupon said plastic nozzle; and
said thermochromic material changing color by measuring a temperature of either the high volume flow of pressurized chemicals or the high volume flow of synthesized froth foam or both egressing through said plastic nozzle to illustrate to the end-user of the spray gun if the pressurized chemicals and propellant used to prepare the polyurethane foam or the polyurethane froth are at a minimum temperature for proper chemical cure of the pressurized chemicals, the propellant comprising a fluorocarbon and an inert gas in which the propellant enters into the nozzle as a liquid component under the pressure of between approximately 150-250 psi and changes to a gaseous state component during travel through the nozzle and egress therefrom into the environment with turbulent flow between the liquid components, gaseous components and synthesized froth foam; and
said nozzle having a pressure gradient between a variable orifice, said orifice being a minimum distance between a valve seat and a cylindrical tip portion of a metering rod, which as the orifice opens, the gradient expands increasing a distance at which the phase change occurs which increases a backpressure in the nozzle, which at least partially improves metering of dispensing at high flow conditions and displaying a color change in dependence upon temperature of the high volume flow of pressurized chemicals or high volume flow of synthesized froth foam or both.

29. The color-changing plastic spray gun nozzle of claim 28 wherein
said at least one thermochromic material is a liquid crystal or a leuco dye.

30. The color-changing plastic spray gun nozzle of claim 28 wherein
said thermochromic material is affixed upon said plastic nozzle by a label containing said thermochromic material.

31. The color-changing plastic spray gun nozzle of claim 28 wherein
said at least one thermochromic material is at least two thermochromic materials disposed within or thereupon said nozzle, each of said at least two thermochromic materials effecting a color change at a different temperature.

32. The color-changing plastic spray gun nozzle of claim 31 wherein
said at least one thermochromic material is at least three thermochromic materials disposed within or thereupon said nozzle, each of said at least three thermochromic materials effecting a color change at a different temperature.

33. The color-changing spray gun nozzle of claim 28 wherein
said thermochromic material changes color from blue when the temperature is below the minimum temperature to transparent or translucent above the minimum temperature.

34. The color-changing spray gun nozzle of claim 33 wherein
the minimum temperature is approximately 60° F.

* * * * *

UNITED STATES PATENT AND TRADEMARK OFFICE
CERTIFICATE OF CORRECTION

PATENT NO. : 9,233,385 B2
APPLICATION NO. : 13/893911
DATED : January 12, 2016
INVENTOR(S) : Stefan Gantenbein et al.

It is certified that error appears in the above-identified patent and that said Letters Patent is hereby corrected as shown below:

Specification

In Col. 5, line 36, "138" should read --13B--;
In Col. 5, line 39, "148" should read --14B--.

In Col. 11, line 30, "138" should read --13B--;
In Col. 11, line 44, "138" should read --13B--.

In Col. 12, line 1, "138" should read --13B--;
In Col. 12, line 2, "138" should read --13B--;
In Col. 12, line 6, "138" should read --13B--.

In Col. 13, line 19, "148" should read --14B--;
In Col. 13, line 30, "148" should read --14B--;
In Col. 13, line 44, "148" should read --14B--.

Signed and Sealed this
Third Day of May, 2016

Michelle K. Lee
*Director of the United States Patent and Trademark Office*